US 6,556,261 B1

(12) United States Patent
Krusius et al.

(10) Patent No.: US 6,556,261 B1
(45) Date of Patent: *Apr. 29, 2003

(54) METHOD FOR ASSEMBLING A TILED, FLAT-PANEL MICRODISPLAY ARRAY HAVING REFLECTIVE MICRODISPLAY TILES AND ATTACHING THERMALLY-CONDUCTIVE SUBSTRATE

(75) Inventors: J. Peter Krusius, Ithaca, NY (US); Donald P. Seraphim, Vestal, NY (US)

(73) Assignee: Rainbow Displays, Inc., Endicott, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/597,662

(22) Filed: Jun. 21, 2000

Related U.S. Application Data

(62) Division of application No. 09/250,486, filed on Feb. 15, 1999.

(51) Int. Cl.[7] ............... G02F 1/133; G02F 1/1347; G02F 1/1333
(52) U.S. Cl. ............... 349/73; 349/74; 349/122
(58) Field of Search ............... 349/73, 74, 20, 349/21, 122, 45, 153, 155, 158, 190; 345/103

(56) References Cited

U.S. PATENT DOCUMENTS 3,861,783 A * 1/1975 Dill et al. ............... 350/160
5,475,514 A * 12/1995 Salermo et al. ............... 359/41
5,539,550 A * 7/1996 Spitzer et al. ............... 359/59
5,661,531 A * 8/1997 Greene et al. ............... 349/73
5,674,758 A * 10/1997 McCarthy ............... 437/21
5,711,693 A * 1/1998 Nam et al. ............... 445/24
5,748,268 A * 5/1998 Kalmanash ............... 349/47
5,757,443 A * 5/1998 Kobayashi ............... 349/5
5,757,445 A * 5/1998 Vu et al. ............... 349/45
5,812,226 A * 9/1998 Izumi et al. ............... 349/73
5,854,616 A * 12/1998 Ota et al. ............... 345/100
5,867,236 A * 2/1999 Babuka et al. ............... 349/73
5,875,011 A * 2/1999 Pierson et al. ............... 349/73
6,005,649 A * 12/1999 Krusius et al. ............... 349/73
6,097,455 A * 8/2000 Babuka et al. ............... 349/73
6,115,092 A * 9/2000 Greene et al. ............... 349/74

FOREIGN PATENT DOCUMENTS

JP 64-35527 * 2/1989
JP 1-195421 * 8/1989
JP 63-289527 * 8/1989

* cited by examiner

Primary Examiner—Robert H. Kim
Assistant Examiner—Mike Qi
(74) Attorney, Agent, or Firm—Salzman & Levy

(57) ABSTRACT

This invention describes fabrication techniques for producing microdisplays suitable for combining into tiled, flat-panel displays having visually imperceptible seams. Assembly techniques to overcome flatness requirements imposed by tiled, flat-panel display assemblies are also described. Edge treatment techniques for individual microdisplays while still part of the silicon die or wafer are also described. The use of these inventive techniques allows the assembly microdisplays into tiled, flat-panel that are appear visually seamless and optically uniform.

24 Claims, 7 Drawing Sheets

METHOD FOR ASSEMBLING A TILED, FLAT-PANEL MICRODISPLAY ARRAY HAVING REFLECTIVE MICRODISPLAY TILES AND ATTACHING THERMALLY-CONDUCTIVE SUBSTRATE

This application is a divisional of copending patent application Ser. No. 09/250,486, filed Feb. 15, 1999, and is related to copending patent applications titled "Tiled Flat Panel Displays", Ser. No. 08/571,208, filed Dec. 12, 1995; and "Tiled, Flat-Panel Microdisplay Array Having Visually Imperceptible Seams", Ser. No. 09/120,569, filed Jul. 22, 1998. This application is also related to U.S. Pat. No. 5,661,531, titled "Tiled, Flat-Panel Display Having Invisible Seams". All three applications are hereby included by reference.

FIELD OF THE INVENTION

This invention relates to electronic flat panel displays and, more particularly, to a method for assembling tiled semiconductor microdisplays into a single composite flat-panel display, the projected image of which has visually imperceptible seams.

BACKGROUND OF INVENTION

Microdisplays ($\mu$Ds) are the most recent addition to the family of flat-panel displays. While $\mu$Ds are based on a number of different techniques to generate or modulate light, all use microfabrication to produce a rectangular array of pixels on a semiconductor back plane, usually silicon. Examples of demonstrated $\mu$Ds include liquid crystal displays (LCDs), field emission displays (FEDs), and digital micro-mirror displays (DMDs). Pixels in $\mu$Ds can be fabricated to have pitches in the range of approximately 10 $\mu$m×10 $\mu$m to 30 $\mu$m×30 $\mu$m. For a 10 $\mu$m pixel pitch, the display array size is approximately 10.24 mm×7.68 mm assuming XGA resolution (1024×768 pixels). Control, driver and image processing circuits may be embedded into the back plane. When viewed through a suitable magnifying lens, such $\mu$D pixel arrays can be designed to appear to the human observer as equivalent to a desktop monitor (e.g., a 15" diagonal monitor) when viewed at a distance of approximately twice the diagonal dimension. In such magnified applications, $\mu$Ds are suitable for use, for example, in portable television (TV), compact disc (CD), digital video disc (DVD), personal digital assistant (PDA) applications, and the like.

In contrast, when projected on the front or back side of a large screen through an optical system, $\mu$Ds have the potential to produce images that rival conventional projectors using polycrystalline LCDs. In this projection configuration, $\mu$Ds may be used in applications such as large screen TV, multi-user (multi-viewer) computer, multi-media, and home theater. However, many design and fabrication problems have heretofore prevented the realization of this potential. For example, reflective microdisplays generally have a rather low geometric efficiency, which makes high brightness projected images difficult to achieve. Microdisplays also force the use of small size arc lamps or special lamps that provide high luminous output at small source size in order to maintain the geometric efficiency. High resolution $\mu$Ds with larger pixel pitches also would require unacceptably large chip sizes.

The construction of a typical reflective LCD $\mu$D device is described hereinafter and serves as a starting point for describing tiled $\mu$D assemblies. The tiling structures, fabrication methods, and circuits for other reflective or emissive $\mu$Ds are essentially the same and are not described separately.

The back plane of a typical $\mu$D is formed from a crystalline silicon chip which includes integrated circuits (ICs). Typically these are of the CMOS family. Therefore CMOS is used here to represent all other suitable integrated circuit families. The CMOS ICs used in $\mu$Ds are fabricated using a typical SRAM-like process as is well known to those skilled in the art. Minimum feature sizes of less than 1 $\mu$m are typical on such chips. No significant difference in the fabrication process compared to standard CMOS chips occurs until the application of the upper levels of metal interconnect. Multi-layer Al/SiO$_2$ metalization is still used but the topmost metal layer forms a two-dimensional array of rectangular mirrors, each about 10–30 $\mu$m on the side with a gap of about 1 $\mu$m between each pair. These mirror elements serve as the pixels of the $\mu$D; the topmost Al layer being polished to a mirror finish in order to serve as a highly effective optical mirror with a reflectivity generally greater than 80%.

The gaps between the mirror elements are filled with a dielectric material, typically SiO$_2$, with low optical reflectivity. The ratio of the optically active area of each mirror to the entire area of the mirror plus any optically inactive areas, such as the gaps, is called the aperture ratio. Typical $\mu$D aperture ratios are on the order of 85%, much higher than is possible with direct view transmissive active matrix liquid crystal displays (AMLCDs). The metal layer immediately under the mirrors forms light shields under the gaps that prevent light from reaching the light sensitive CMOS circuitry in the back plane.

Each mirror element is connected to a CMOS driver circuit through single or multiple vias that provide the voltage to that particular pixel. The rest of the metal interconnect in/on the back plane is used for conventional addressing of the pixels (e.g., matrix addressing) and for regular circuit functions and services for the CMOS circuitry. The CMOS back plane can also contain some or all of the circuits needed for display addressing (e.g., row and column drivers for matrix addressing), control circuits, and any desired image processing circuits.

Given the CMOS back plane with the mirror elements, the $\mu$D is assembled as follows. A passivation layer and an optional LCD alignment layer are applied to the top of the mirror plane. A seal bead with a small fill port is next dispensed around the pixel array in the periphery using screen-printing or a dedicated dispensing system. Separately, a glass cover plate is fabricated having on its lower side a conductive transparent electrode film (e.g., indium-tin-oxide (ITO)), and possibly another alignment layer for the LC material. Large area microfabrication techniques may be used to make arrays of cover plates, which may be scribed and broken into appropriate sizes.

The cover plate is placed on the seal, aligned to the CMOS back plane mirror array and then bonded to the seal bead. The display is next filled with a suitable liquid crystal (LC) material, such as a twisted nematic liquid crystal (TN-LC) or a ferroelectric liquid crystal (FLC) material, and then the fill port is sealed. This LC fill may also contain spacer particles that are dispensed throughout the fill, unless spacers have optionally already been fabricated on top of the mirror array or cover plate using microfabrication techniques. Electrical connections from the conductive electrode on the underside of the common cover plate to the silicon back plane are made at the same time, for example using conductive adhesive.

A polarizer film may be applied on the top surface of the cover plate or placed elsewhere into the optical system. Next the µD component is mounted on an interconnect substrate, usually flex, and electrical connections are made from the edge of the CMOS back plane to the substrate. Finally, the µD component is suitably encapsulated, thus providing environmental protection. Plastic encapsulation is typically used in consumer products. The resulting µD modules produced in this manner are compact, lightweight, and relatively inexpensive.

The optical systems for use with µDs provide three separate functions: (a) provision of light, (b) formation of color, and (c) magnification of the image to the desired size. There are several ways to produce color. Most direct view transmissive AMLCDs form color by placing a color triad (e.g., red, green, and blue) into each pixel, using white back light and patterned color filters. This is called the spatial color generation technique. Since this increases the pixel pitch by a factor of three compared to a monochromatic pixel array, this technique is not usually preferred in µDs. The second way for producing color is to use a separate display unit for each color and then to combine the colors into a single, final image. This so-called three channel approach is the favored technique in commercial front-projection displays with polysilicon transmissive LCDs. However in µD applications, this approach may be acceptable only in large rear projection systems. In the third method, the mirror array is illuminated sequentially with the different primary colors, one at the time, thus forming the proper color mix as a time average in the human vision system. This is called the field sequential approach. The sequential field colors can be formed from white light by using a three-color filter on a "color wheel" or from three separate color light sources. In some magnified view µDs, compound semiconductor solid state light emitting diodes (LEDs) are modulated to produce the field sequential illumination of the mirror array. Field sequential operation requires a pixel response time that is fast enough to resolve the short illumination times. For example, at VGA resolution and a frame rate of 60 Hz, the pixel response time should be on the order of 30 µs or better.

The magnification of the image can be accomplished using refractive or reflective lens assemblies that are well known and widely utilized in standard optical projection systems.

Consider as an illustration the characteristics of a µD manufactured by Displaytech of Longmont, Colo. Their VGA display has 640×480 pixels, a pixel pitch of 13 µm, a pixel spacing of 1 µm, FLC fill, an aperture ratio of 85%, an 85% mirror reflectance, field sequential 15 bit color (32,768 colors), a pixel array size of 8.32 mm×6.24 mm, and a 60 mW chip power consumption. The full display engine uses field sequential illumination from red, blue, and green LEDs, and a single external polarizer. The pixel response time is on the order of 30 µs, fast enough to support field sequential operation.

Although currently available µDs provide only VGA and SVGA resolutions (640×480 and 800×600, respectively), much higher resolution devices are anticipated in the future. The following table summarizes characteristics of higher resolution µDs that may be available in the future. Two pixel pitches, 10 and 30 µm, are given in this table. The 10 µm pitch is representative of field sequential or multi-channel color and the 30 µm pitch of spatial color. The right-most column specifies the magnification factor for rear projector applications with a 40" screen diagonal. Similar numbers can be generated for magnified view µD applications. It can be seen from this table that higher resolution displays lead to very large chip sizes, especially for spatial color modulation. Such chip sizes are impractical from the point of view of the manufacturing yield and cost.

| Acronym | Resolution | Pixel Pitch | Array Size mm | Magnification to 40" = 1002 mm Diagonal |
|---|---|---|---|---|
| VGA | 640 × 480 | 30 µm | 19.2 × 14.4 | 41.8× |
|  |  | 10 µm | 6.4 × 4.8 | 125× |
| SVGA | 800 × 600 | 30 µm | 24 × 18 | 33.4× |
|  |  | 10 µm | 8 × 6 | 100.2× |
| XVGA | 1024 × 768 | 30 µm | 30.1 × 23.0 | 26.6× |
|  |  | 10 µm | 10.2 × 7.7 | 78.5× |
| SXGA | 1280 × 1024 | 30 µm | 38.4 × 30.7 | 20.9× |
|  |  | 10 µm | 12.8 × 10.2 | 62.6× |
| UXGA | 1600 × 1200 | 30 µm | 48 × 36 | 16.7× |
|  |  | 10 µm | 16 × 12 | 50.1× |
| TBA | 1800 × 1440 | 30 µm | 54 × 43.2 | 14.8× |
|  |  | 10 µm | 18 × 14.4 | 44.5× |

It is therefore an object of the invention to provide methods for fabricating tiled, flat-panel displays composed of multiple microdisplays (µDs) in order to overcome the size limitation of higher resolution monolithic displays.

It is a further object of the invention to provide a method for fabricating a tiled, flat-panel display composed of multiple microdisplays and having visually imperceptible seams between the µD tiles.

It is an additional object of the invention to provide a method for fabricating tiled, flat-panel µD displays having the µD tiles attached to a common substrate.

It is another object of the invention to provide a method for fabricating tiled, flat-panel µD displays having common semiconductor substrates.

It is a still further object of the invention to embed control circuitry in either the semiconductor back plane of the µDs and/or in the common semiconductor substrate.

It is an additional object of the invention to fabricate a common substrate which is thermally and mechanically matched to the thermal and mechanical characteristics of the individual µD tiles.

It is yet another object of the invention to fabricate cooling structures as part of the tiled, flat-panel µD structure to maintain the operating temperature of the display.

It is a still further object of the invention to fabricate heat-generating means in the display which, when coupled to appropriate temperature sensors and control circuitry, can dynamically maintain essentially a fixed temperature in the tiled, flat-panel µD assembly.

SUMMARY OF INVENTION

The present invention describes methods for fabricating larger size microdisplays through a technique called physical tiling, in which multiple microdisplay (µD) components (tiles) are assembled together such that the resulting composite display appears to the observer as a single, monolithic display with no visually perceptible seams, discontinuities, or non-uniformities. The objective is to overcome the chip size, geometric efficiency, resolution, contrast, yield, and back plane technology limits inherent in monolithically fabricated microdisplays. The lower magnification facilitated by the larger pixel array size simplifies projection and/or eyepiece optics and reduces aberrations and chromatic lens distortions.

The display tiles in the preferred embodiment are arranged in a regular two-dimensional array such that all tiles have at least one external edge and one to three internal edges, thus allowing the connections to each display tile to be made at one or more external edges. This leads to 1×2, 2×1, 2×2, 2×n and n×2 tile arrays. Larger n×m arrays may be constructed with connections brought to the top surface of the µD tiles by deposition of metal and circuitization on the edges of the µD tiles. The µD tiles can be fabricated on silicon CMOS wafers using the same or similar microfabrication techniques that are used for monolithic µD chips. Tiles may also come from different fabrication lines or chip technologies. The internal edges are fabricated using lithographic pattern definition and special die separation techniques to a high precision on the order of 1–10 µm or less. The required space for the internal seams are provided by special layout of the mirrors on the µD tiles. The thickness and planarity of the tiles is controlled using chemical-mechanical polishing (CMP). The tiles are then assembled into a precise n×m array on a thermally matched substrate, the seams between the tiles are filled with a suitable sealant and, optionally, spacers may be provided. The fabrication of the composite tiled µD then follows the conventional process used for making monolithic µDs.

The optical magnification and projection system for the composite µD can be designed and fabricated in the same fashion as that for conventional monolithic µDs, except for the fact that the field size can be n×m times larger than that of a single µD. These composite µD arrays provide a larger viewable area for magnified displays, thus increasing the number of pixels and the achievable resolution, improving the geometric efficiency, enhancing the viewing angles, and reducing eye strain. Similarly, tiled projection µDs can provide larger pixel counts, higher resolutions, larger image sizes at the same total magnification, better optical efficiency, lower optical power density, and higher contrast for the same viewable image size.

BRIEF DESCRIPTION OF THE DRAWINGS

A complete understanding of the present invention may be obtained by reference to the accompanying drawings, when taken in conjunction with the detail description thereof and in which.

DESCRIPTION OF THE PREFERRED EMBODIMENT

The embodiment chosen for purposes of disclosure of the microfabrication and precision assembly of tiled microdisplays (µDs) uses reflective liquid crystal (LC) µDs. It should be noted that the same principles can be applied to other types of reflective or emissive microdisplays, such as vacuum field emission, light emissive, and micromirror µDs, which are considered to be covered by this invention as well.

A number of fabrication, assembly and packaging issues arise from tiling that are different from those encountered in monolithic µDs. Several methods to overcome these problems are described herein below. These can be classified to address the following aspects of the tiled composite µD: (1) precision fabrication of the inner edges of the µD tiles, (2) making the tiled µD assembly optically flat, (3) precision alignment of µD tiles, (4) fabrication of light shields embedded into the seams between µD tiles, (5) backfilling of the seams between µD tiles, (6) mounting µD tiles on a common matched substrate, (7) locating light shields in the tiled assembly, (8) assembling a composite tiled display unit, and (9) fabricating connections from the cover plate to the silicon back plane. These fabrication, assembly, and packaging issues will, in the following, be described in the discussion of a typical process flow rather than individually without relation to each other.

Description of Process Flow

Figure 1:
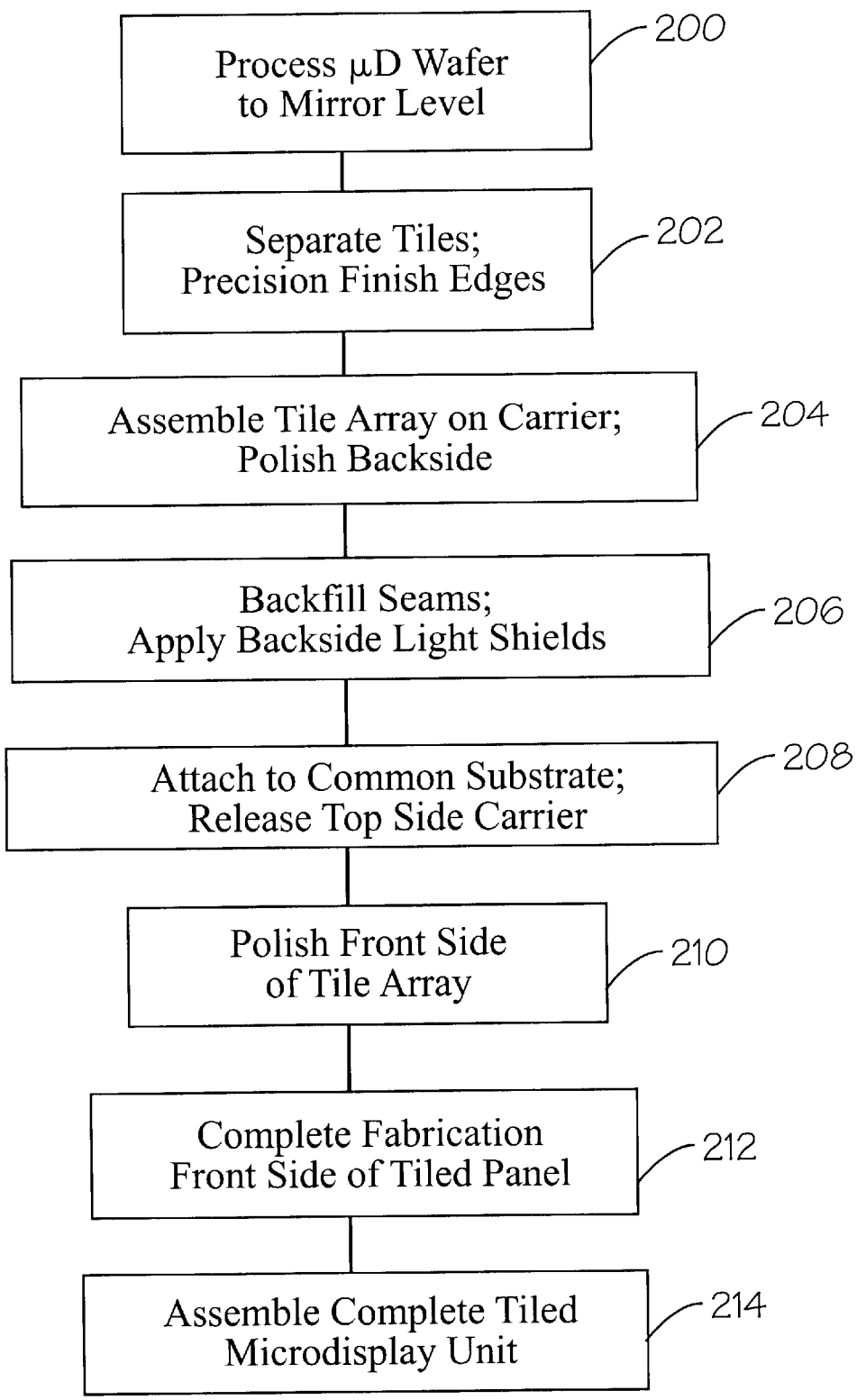
FIG. 1 is a flow chart for the process for the fabrication of a tiled microdisplay.
Figure 2:
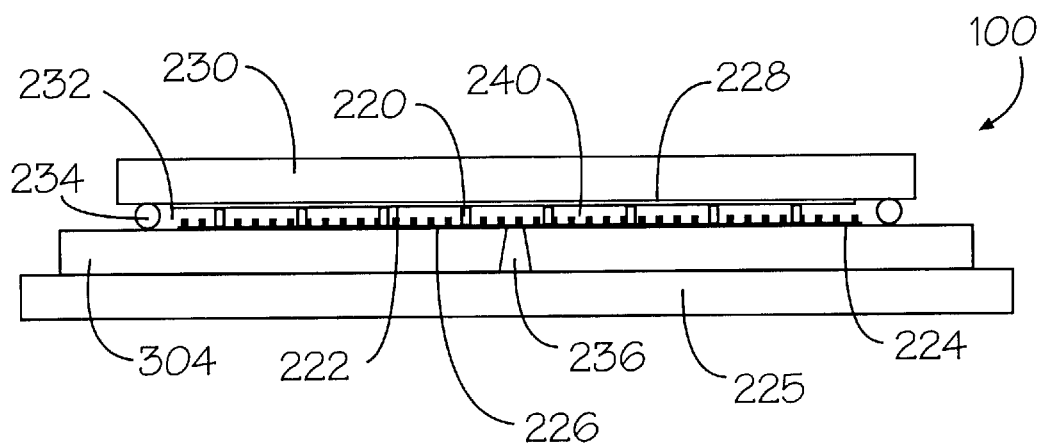
FIG. 2 is a cross-sectional schematic view of an assembled tiled microdisplay unit.

Referring now to FIG. 1, there is shown a flow chart summarizing the steps for microfabricating and precision assembling a tiled composite µD as described in detail hereinabove. First, a silicon µD tile wafer is processed normally as far as the formation of the mirror layer, step 200. The individual µD tiles are then separated and at least all inside tile edges are precision finished, step 202. The tile array is then assembled on a temporary top side carrier. At this point the back sides of the tiles can be polished flat to a uniform thickness using CMP techniques, step 204, if desired. Next, seams between tiles can be filled from the backside and light shields are applied if desired, step 206. At this point the backsides of the tiles can be polished again to smooth over any seam fill material that has landed on the backside, if desired. The tile array is next mounted on a common permanent TCE matched substrate and thereafter the temporary top side carrier is released, step 208. The front side of the array is next polished, if necessary, using CMP techniques to the final optical local flatness, step 210. Finally, the tiled µD panel is finished, step 212, using additional topside thin film processing. This step 212 can include the fabrication of light masks 224 (FIG. 2), LCD spacers 220, LCD alignment layers 222, passivation layers 226, LCD seals and electrical contacts from the cover plate to the silicon back planes 225. Upon completion of these steps the tiled µD can be assembled, step 214, including the cover plate 230, LCD seals 234, and other optical or electrical components (not shown) used in µD's.

Requirements for Tiling Microdisplays

In order to appear visually uniform and seamless, the tiles of the composite μD shall be aligned to each others such that (a) in the plane of the mirrors on the tiles (X-Y plane) the pixel pitch remains constant, within acceptable tolerances, over all pixels in the array, whether on a single tile or adjacent tiles, and (b) the pixel mirror array should have a local surface flatness in the Z-direction on the order of the wavelength of light, or less. X-Y alignment should generally be done to a precision much better than the size of the pixels, for example less than ±1 μm for 10 μm pixels in order to avoid image segmentation across the seams between tiles. The local Z-direction flatness should be on the order of 100 nm. Surface undulations typical of the best available polished silicon surfaces can be much larger than this. These are very stringent and unusual requirements for locating silicon chips, especially in the Z-direction. Surface undulations can be tolerated because of the spacers that locally control the thickness of the liquid crystal fill and thus the optical retardation. Furthermore, the perception characteristics of the eye are more tolerant to smooth surface variations than to abrupt discontinuities, whether in brightness or color.

These requirements are fulfilled on monolithic μDs by using smooth silicon wafers and through careful control of the thin film overlayer topography. However, if these techniques were used to fabricate μD tiles, which were subsequently assembled into a tiled array using conventional packaging technologies, the mirror surfaces across the seams on adjacent tiles would never meet the local flatness requirement. Perfect alignment in the X-Y direction would not compensate sufficiently for lack of flatness from tile to tile.

Processing of μD Tile Wafers

The local optical flatness in tiled μDs can be accomplished using the following novel processing and assembly techniques. The μD tiles are first fabricated on commercial smooth silicon wafers using a conventional μD fabrication process well known to those skilled in semiconductor manufacturing. This process is taken only to the optically active layer (i.e., the metal mirror level in reflective displays), rather than to completion. It is preferred that all tiles for a given composite μD either be fabricated on the same silicon wafer and on wafers with a matched thickness, so that all μD tile chips have approximately the same thickness. No yield reducing tile grouping on the wafers will generally be necessary. Chemical mechanical polishing (CMP) can be used at this stage to planarize and polish the top side of the wafer to a locally flat surface in order to control the thin film topography. CMP is routinely used in semiconductor manufacturing of multi-level metal interconnect on integrated circuit chips to a precision of a fraction of 1 μm.

Precision μD Tile Separation and Edge Finishing

Next, the μD tiles are precision diced from the wafer. In integrated circuit chip manufacturing this is done by scribing and breaking. Special techniques must be used to place, orient, and finish the inside edges of each μD tile. These techniques will be described in detail herein below.

For example, with a pixel pitch on the order of 10 μm, and an aperture ratio greater than 50%, the spacing between the adjacent mirrors should be on the order of 3 μm wide. The same seam width should be maintained across the inside edges of the gaps between two adjacent tiles. Since the edges of the silicon chips are normally not finished to such a precision, special techniques must be employed to finish the edges. These techniques are best used in wafer fabrication immediately after the completion the top surface mirror layer, and applied to the full wafer rather than to individual tile chips. If desired, the outside edges of tiles could be finished using conventional scribe and break techniques such as those routinely used for integrated circuit chips. Alternatively, they may be sawed with a wire saw. However, it might be the best to fabricate all edges, whether inside or outside, at the same time using the same technique.

A precise spatial reference to the inside edges is available in the thin film lithography layers on the silicon μD tiles that are routinely processed to deep sub-micrometer precision (0.25 μm minimum feature sizes in state of the art silicon manufacturing, i.e., at the time of the instant patent application).

Figure 3:
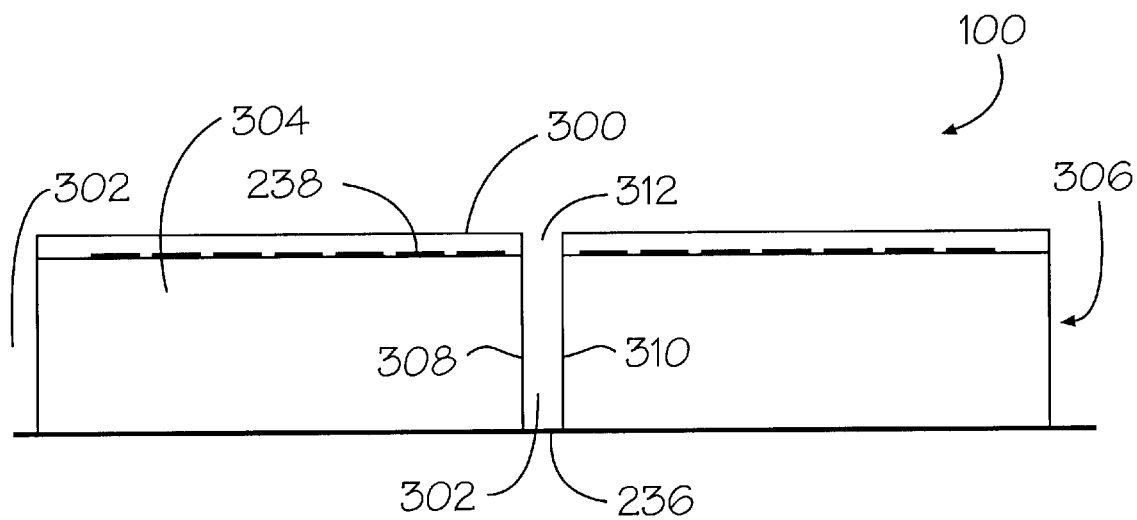
FIG. 3 is a cross-sectional view of a microdisplay tile wafer with a deep etch separating display tiles on an 0 etch chuck.

Referring now to FIG. 3, there is shown a first edge finishing technique based on a deep silicon etch. Using a suitable etch mask 300, which may be resist or inorganic film such as $SiO_2$, or combination of organic and inorganic films, that has been fabricated with front surface lithography and pattern transfer, a deep silicon etch can be performed in the kerf areas 302 between the μD tiles 304 on the wafer. Because tiles 304 can be spaced apart on the wafers 306, only the edges or sidewalls 308, 310 of the deep etch 312 need to be controlled with high precision. Thus any etch pattern or loading dependent effects can be avoided. For example, $Cl_2$ and $BCl_3$ chemistries for anisotropic plasma or reactive ion etching conditions have recently been developed for bulk micromachining in micro-electro-mechanical system (MEMS) applications that meet the present requirements. The parameters of such etches can be adjusted such that the sidewalls 308/310 flare out (not shown) during the etch, thus creating an undercut (not shown). Such an undercut greatly helps maintain high precision at the top surface of the wafer and facilitates easier filling of the seams 236 from the back side, if this is desired. The etch can be taken to partial completion through the wafer, followed by cleaving or sawing; or, alternatively, taken all the way through the wafer. About 50:1 aspect ratios have been etched in this fashion with state of the art dry etch tools. The etch depth can be minimized by using thin wafers or alternatively thinning the wafers via CMP prior to etching. Such wafer lapping techniques are routinely used in integrated circuit wafer manufacturing in the semiconductor industry.

Figure 4:
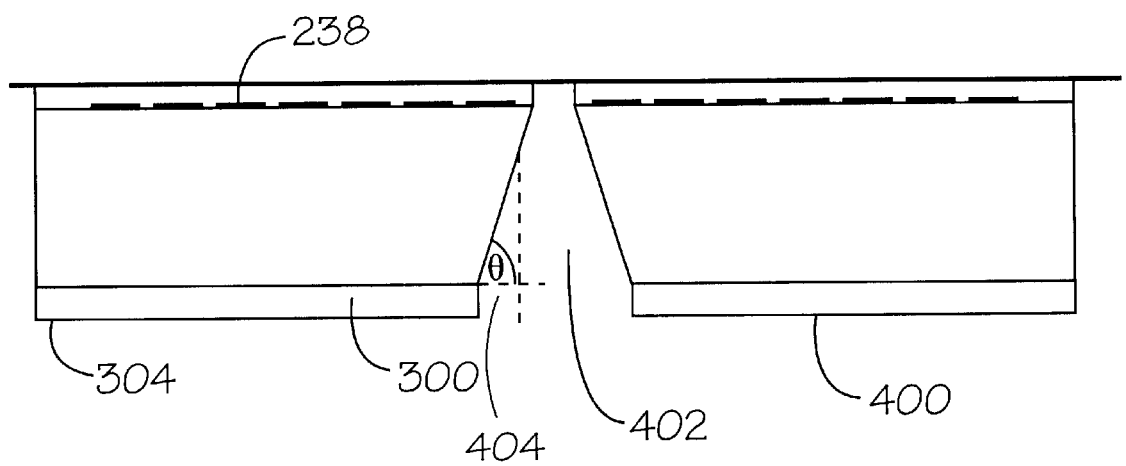
FIG. 4 is a cross-sectional view of a microdisplay tile wafer after v-groove etching from the backside to separate tiles.

Referring now to FIG. 4, there is shown another embodiment of the precision edge finishing technology, based on anisotropic wet etching of silicon. In this method, the orientation dependence of the etch rate in a crystalline substrate is exploited. More than a 100:1 etch rate differentiation can be reached between the (100) and (111) crystalline directions in silicon. On (100) oriented silicon wafers, etching can be performed from the back side 400, thus forming an approximately 57° wall slope 404 "θ" to the back surface 400 (V-groove etch 402). In order to use this etch the patterns on the wafer should be carefully aligned to the crystalline axes to a precision of about 10 or better. This can be done using x-rays or test etches performed at the edge of the wafer. Alignment to top surface patterns or marks can, for example, be performed using infrared light through the wafer. This automatically creates the desired undercut.

However, precise μD tile top edge control may be difficult because of local non-uniformities in the etch rate, which depend on the local temperature, etchant flow, reaction product removal, or slight misalignment of layout patterns to crystalline axes. Therefore, it may be desirable to combine the back side, V-groove etch with a precisely aligned top surface shallow etch described hereinabove.

Figure 5:
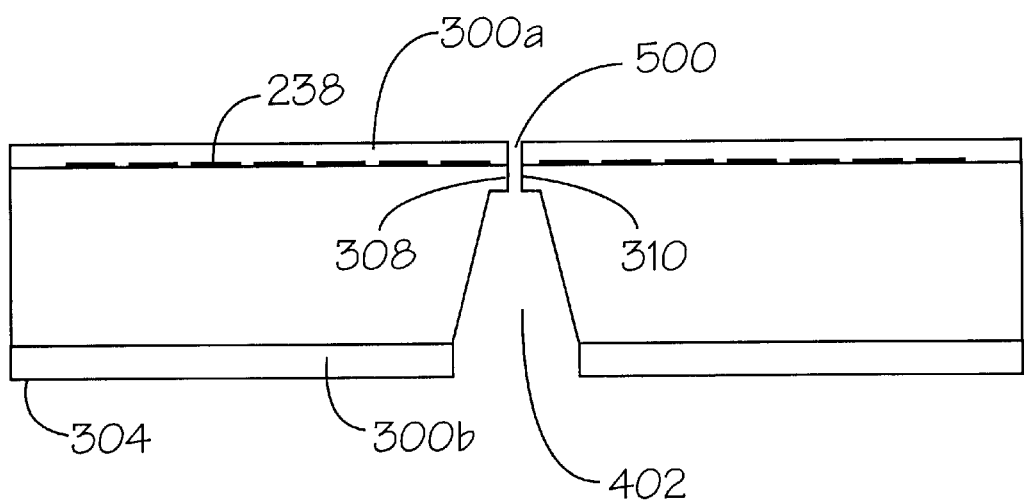
FIG. 5 is cross-sectional view of a microdisplay tile wafer with the tiles separate using a backside V-groove etch combined with a front side shallow etch.

Referring now to FIG. 5, the combination of the deep backside V-groove etch 402 and the shallow front etch 500 are illustrated. This etching combination can still be performed economically in the batch mode on large wafers. The advantage of this method is that no final cleave is needed.

Figure 6:
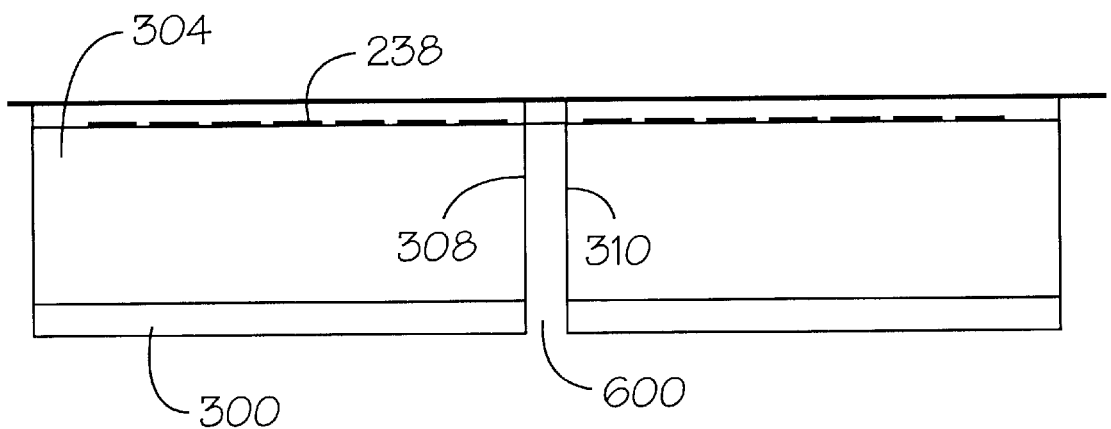
FIG. 6 is a cross-sectional view of a microdisplay tile wafer with the tile separate by a backside anisotropic etch on (110) oriented wafer.

Referring now to FIG. 6, in an alternate embodiment on (110) oriented silicon μD tile wafers, the anisotropic etch 600 produces trenches with vertical walls 308, 310 and an aspect ratio on the order of 100:1 or better, as illustrated in FIG. 6. The etch mask can again be referenced to the front side pattern produced via lithography, thus fabricating sidewalls that are ideally aligned but which may suffer from small variations in etch rate along the inside edges. Since μD tile edges can be aligned with the (111) crystalline direction which has a very low etch rate, the edge can be located precisely and made very closely aligned to the crystalline axes.

In rare cases, for example when cleaving has been used, it may be desirable to polish the edges of the tiles after the precision micromachining. This can be done using a "variation" of CMP. The polishing slurries and pads (not shown) can be adopted from conventional planar CMP with planetary motion, but the horizontal orbital motion would have to be replaced with vertical orbital motion, or lateral motion along a vertical or angled polishing wheel. However, if this is done after cleaving the μD tiles from the wafer, only one tile, or a row of tiles, can be polished at a time. Hence, this type of edge polishing technique may limit the throughput and thus unnecessarily increase the manufacturing cost. Conventional grinders can also be used for edge finishing, but edge placement and control on the 1 μm level is likely to render these techniques difficult. Alternative tile edge finishing techniques are provided by isotropic dry etching techniques done in the plasma or reactive ion configurations. Many silicon dry etches that are commonly used in microfabrication can be tuned to perform edge smoothing, polishing, and sidewall residue removal.

Tile Alignment on Temporary Carrier

Precision μD tile alignment and attachment will occur in two steps. In the first step the tile chips are placed on a temporary common carrier or chuck for alignment and polishing purposes as discussed in the following.

Figure 7:
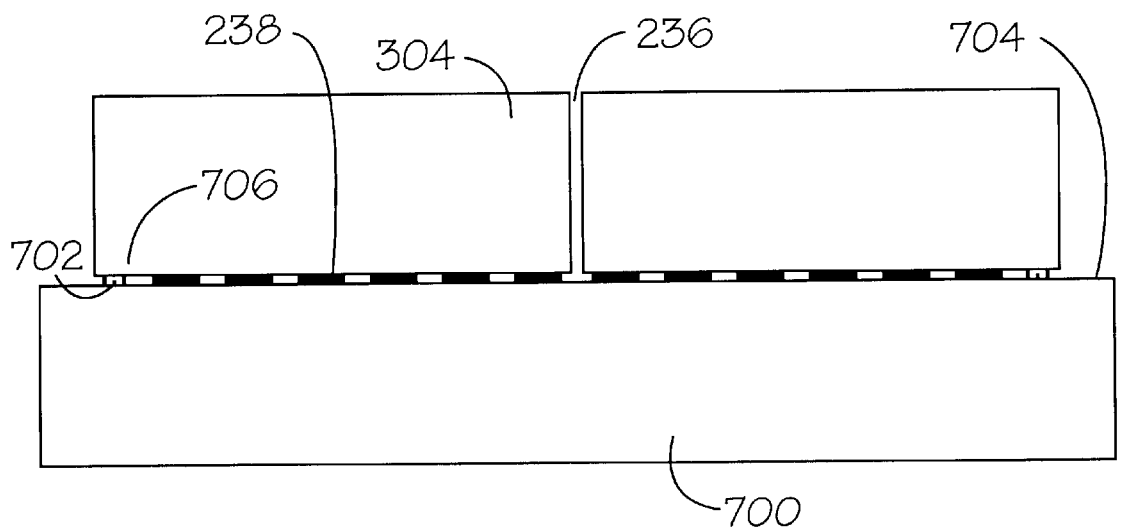
FIG. 7 is a cross-sectional view of microdisplay tiles aligned and attached to a temporary front side tile carrier.

Referring first to FIG. 7, there are shown a plurality of selected μD tiles 304 inverted on the tile carrier 700. Tiles 304 have been selected and placed in an n×m array with appropriate finished edges facing each others (not shown). The temporary carrier 700 can be an optically flat transparent glass plate, which has optical alignment marks 702 on its upper surface 704 (i.e., on the side used for mounting the tiles 304). If the tiles 304 have matching alignment marks 706 outside of the mirror array 238, the tiles 304 can be aligned to a precision of much less than 1 μm using optical alignment marks. For example, techniques and equipment well known to those skilled in the art of optical contact or projection lithography may be used for this alignment task. After placement, tiles 304 may be held in place by an optical adhesive (not shown) that is cured, for example, using temperature or ultraviolet light. Alternatively the tiles may be held in place by a low temperature wafer bonding technique. The selection of the tile bonding material has to be made considering optical transparency, capability to withstand CMP, and ability to separate tiles from the temporary front side substrate after backside polishing. Finally, the tiles may be held in place by vacuum as is customary in optical contact lithography, when keeping mask and wafer in place with respect to each others after alignment. In order to accomplish the alignment optically, the vacuum chuck should preferably be optically transparent.

Tile Array Backside Polishing

Figure 8:
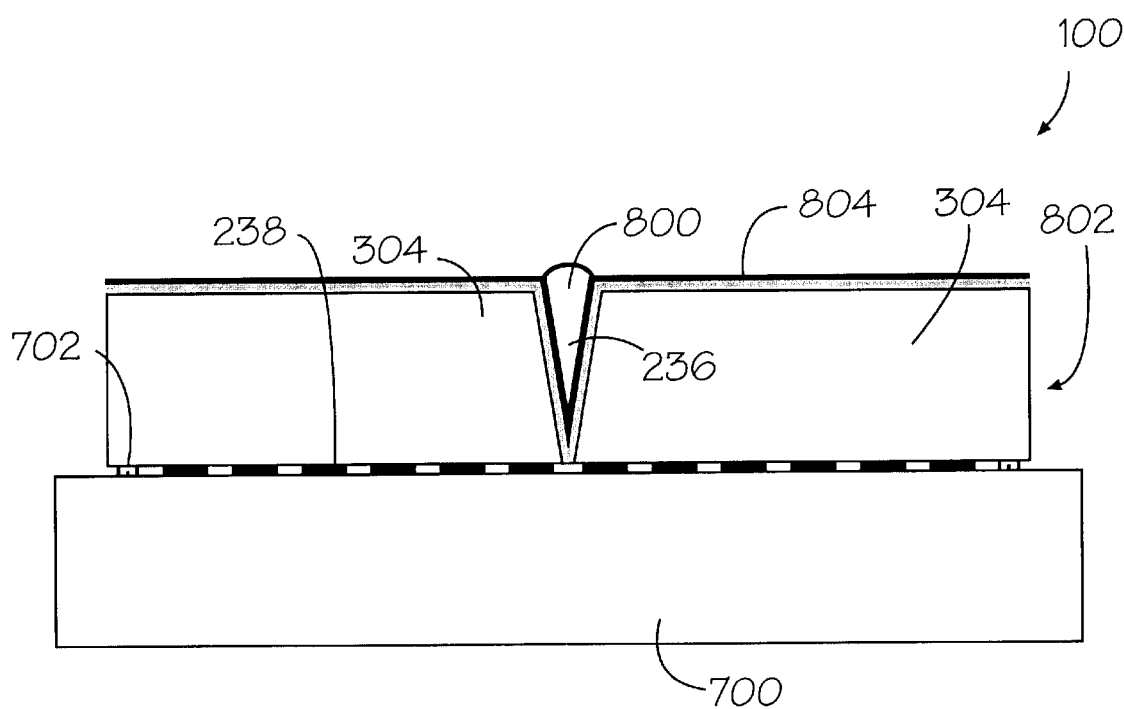
FIG. 8 is a cross-sectional view of a microdisplay tile array with the seam between the tiles filled with a conformal dielectric layer, a conformal metal shield layer, and an organic fill material.

Referring now to FIG. 8, there are shown tiles 304 aligned and fastened to the temporary carrier or chuck 700. Next, a seam fill 800 can be dispensed or deposited on the back side of the array 808 of tiles 304. If necessary, any front side adhesive in the seams may be removed from the open areas prior to the application of the seal material. Organic adhesive layers can easily be removed from the backside using oxygen plasma etching, a technique well known to those skilled in the art of semiconductor manufacturing. The seal 800 may be composed of several dissimilar material layers in order to adjust front and back side CMP characteristics or to insert thin film light shield materials, for the purpose of matching the seam optically to the gaps between the mirrors 238 inside the tiles 304 from the front side. Both inorganic and organic materials can be used. Since typically silicon dioxide is used between the mirror elements on the μD tiles, it may be the preferred material to place into the seam first. Silicon dioxide can, for example, be deposited using plasma enhanced chemical vapor deposition (PECVD) at temperatures compatible with organic materials. A thickness up to 1–5 μm can be reached using this technique. Thin metal films 804 that can serve as light shields can also be deposited into the seam 236 using physical deposition techniques, such as evaporation or sputtering, or PECVD at sufficiently low temperatures. Application of the other seal materials, to partially or completely fill the seam 236 from the back side, can also be performed using low temperature, PECVD, spin-on, screening, liquid fill, or other dispensing techniques well known to those skilled in the art. After application of the seal material 800, the back side of the tile array 802 may be polished flat using CMP. This technique can make over-filled seams 236 flush with the backsides of the silicon tiles 304.

The front side temporary carrier 700 facilitates the attachment of the assembly to a CMP chuck. Typically vacuum is used to hold silicon wafers 304 to the CMP chuck. Vacuum or mechanical or even magnetic attachments can be used to fasten the temporary carrier. Using CMP, it is possible to achieve a local surface flatness on the back side of the tiled assembly within the required specifications. This degree of local flatness can be less than the wavelength of visible light. Therefore, CMP provides a locally smooth surface that spans the entire back side of the μD tile array 802, including the filled seams 236 between tiles 304.

Fabrication of Thermal Control Components and Structures

Since projection microdisplays use rather high optical illumination densities, cooling and temperature control structures and devices may be needed as described in copending patent application "Tiled, Flat Panel Microdisplay Array Having Visually Imperceptible Seams", Ser. No. 09/120,569. Temperature sensor and heating devices can be designed and fabricated into the silicon tile back planes during the wafer fabrication process. For example, native electronic devices, such as semiconductor junction diodes and resistors, can be used for temperature sensing and tile heating purposes, respectively. Electrical access to these devices and their control can, for example, be achieved via on-chip multi-layer metal interconnect and chip-to-package and package-to-flex connections.

When the common matched back side μD tile substrate is made of a semiconductor such as silicon, additional temperature sensing and heating devices over the entire tile array can be fabricated into this substrate. Fabricated feature sizes across this substrate can be much larger than those on the tiles, and thus no manufacturing yield problems will arise.

Tile Array Mounting on Matched Substrate

Upon completion of the optional CMP of the back side, the μD tile array is mounted on the permanent mechanically and thermally matched reasonably flat substrate. A variety of inorganic and organic chip attach materials, such as thermally conductive adhesives that are well known to those skilled in the art of integrated circuit packaging may be used. The thermal conductivity of this adhesive may be enhanced by embedding highly thermally conductive particles, such as diamond and aluminum nitride. The attachment technique and materials should be thermally and mechanically compatible with the front side bonding and any seam fill materials already applied to the tile array. Complete flatness of the backside substrate is not needed at this stage, because the chip attach material can smooth out residual topology. If a polished silicon substrate is used, thermal and mechanical matching is guaranteed irrespective of temperature and other operational conditions. The surface flatness requirement can at the same time be met because of the tight specifications for flatness of state-of-the-art silicon wafers.

Figure 9:
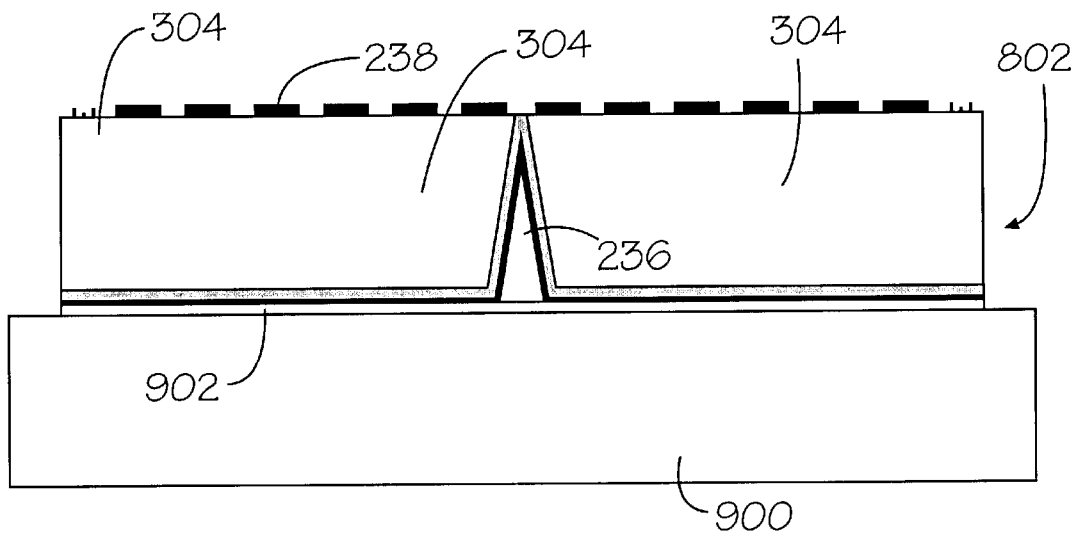
FIG. 9 is a cross-sectional view of an array of microdisplay tiles attached to the backside common tile array substrate.

Referring now to FIG. 9, the front side bonding material is released using a chemical, thermal, optical, shock, or vacuum based separation technique, thus severing the frontside mirror 238 array from the temporary topside carrier 700. The common backside substrate 900 now provides the sole support for the tile chip array 802. Finally, the front-side of the mirror array 238 on the top side of the $\mu$D tiles 304 can be polished one more time, if necessary, to a highly reflective optical finish using CMP. Any residual, smooth undulations typical on silicon wafer surfaces do not cause a performance degradation in the finished, tiled composite microdisplay because the LCD retardation action is locally controlled by small spacers. These are typically in the 1–5 $\mu$m size range. The thickness of the optically active device layer or the mirror layer in reflective $\mu$Ds, should be chosen thick enough to facilitate the second topside polishing of any residual topography or back side assembly tolerances to a locally flat surface. During this front side CMP, the tiles 304 are attached to their final common backside substrate 900 in their aligned locations. Since the pattern density in the tile mirror array is virtually the same over the top surface of the composite display, polishing rates will be uniform over the entire surface. As is sometimes done in CMP, special etch stops can be embedded into the spaces between the pixels, if desired. Such etch stops can be made during the tile wafer manufacturing process using well known microfabrication techniques. Materials, such as silicon nitride, have proven to be good etch stops. This final CMP can also smooth over any front side seam fill material between the tiles 102 that was applied from the back side and guarantee a sufficiently high optical reflectivity, typically around 85% or higher.

Fabrication of Masks

Figure 10:
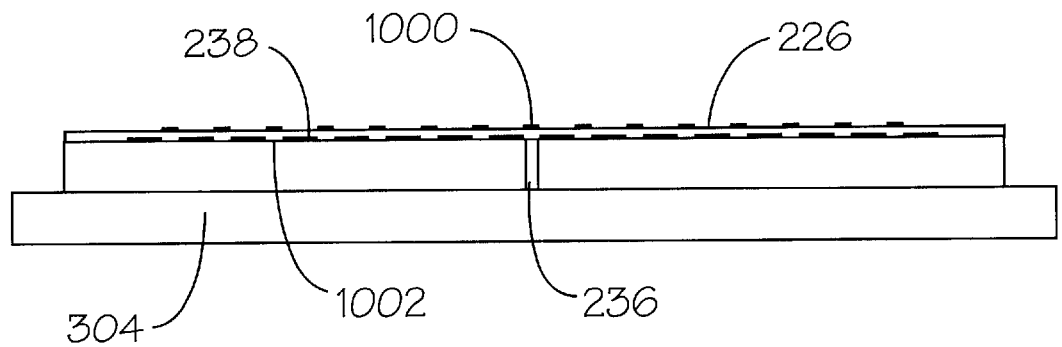
FIG. 10 is a cross-sectional view of a microdisplay tile array with a mask covering the tile seam and other gaps in the mirror array.

Referring now to FIG. 10, masks (light shields) 1000 can be used to hide seams 230 between the $\mu$D tiles 304. Such masks 1000 can, for example, be placed directly on top of the mirror array 238 into the seams 236, and preferably all other equivalent mirror-to-mirror gaps 1002, or on the top or lower surfaces of the common cover plate 230 (FIG. 2) that is facing the tile array. If the mask 1000 is to be placed directly on top of the seams 236, it is best fabricated right after the completion of the tiled mirror array 238 using microfabrication techniques, including lithography, thin film deposition, and etching. The mask 1000 can be made of metallic films, such as chrome, or a dielectric films such as silicon dioxide made optically reflecting and absorbing. Mask alignment can easily be made to the mirror patterns. Since the mask line widths will be on the order of 1–10 $\mu$m and the mirror surface is optically flat, microfabrication will work very well. If the mask needs to be fabricated on the lower surface of the common cover plate, this can also be similarly done via microfabrication, the only difference being that mask alignment then should be done at the time of the final assembly of the cover plate to the tile array of the display rather than during the microfabrication process. Alignment in this case can be done by embedding conventional alignment marks into the periphery of the mirror array 238 on the tiles 304 and into the mask pattern 1000 on the lower surface of the common cover plate 230.

Post-Processing of Tiled Microdisplay

Figure 11:
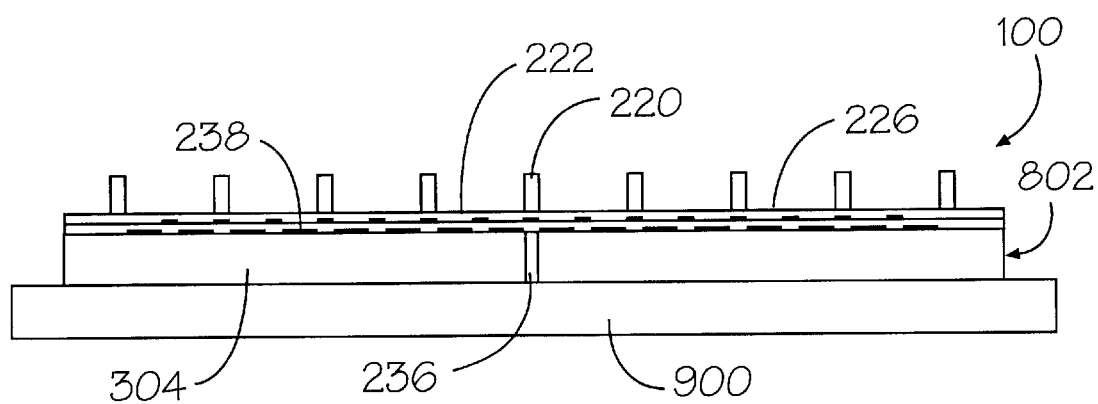
FIG. 11 is a cross-sectional view of a microdisplay tile array with spacers attached to the alignment layer.

Referring now to FIG. 11, there is shown the processing of the composite tiled $\mu$D. This follows similar steps to the processing of monolithic $\mu$Ds (not shown), including for example the application of a common top side passivation layer 226, a common top side alignment layer 222 that may be required for the orientation of the liquid crystal 240, and microfabricated spacers 220 on the tile assembly 100 to equalize the thickness of the liquid crystal fill between the tiles and common cover plate 230. For top plates of typical reflective LCD micro-display designs, the required spacer thickness is on the order of 2–3 $\mu$m, and therefore the spacers 220 can be fabricated via thin film deposition, lithography and etching. As with masks 1000, the spacers 220 can be either fabricated on the tiles 304 or the common cover plate 230. In order to maintain a uniform spacing between the cover plate films (e.g., the ITO layer) in large arrays of tiles, it may be necessary to use a thin glass for the cover plate 230. This allows the cover plate 230 to flex sufficiently to conform to the spacers 220, creating a uniform liquid crystal layer. All of these post-processing steps can be performed uniformly over the entire tile array 802 using well known microfabrication techniques, and hence no further non-uniformities are introduced into the tiled mirror array. If desired, these conventional microdisplay post-processing techniques can be replaced by low temperature equivalent unit processes that are compatible with any organic materials that may have been used in the precision assembly of the tiled $\mu$D.

Final Assembly of Tiled Micro-Display

Figure 12:
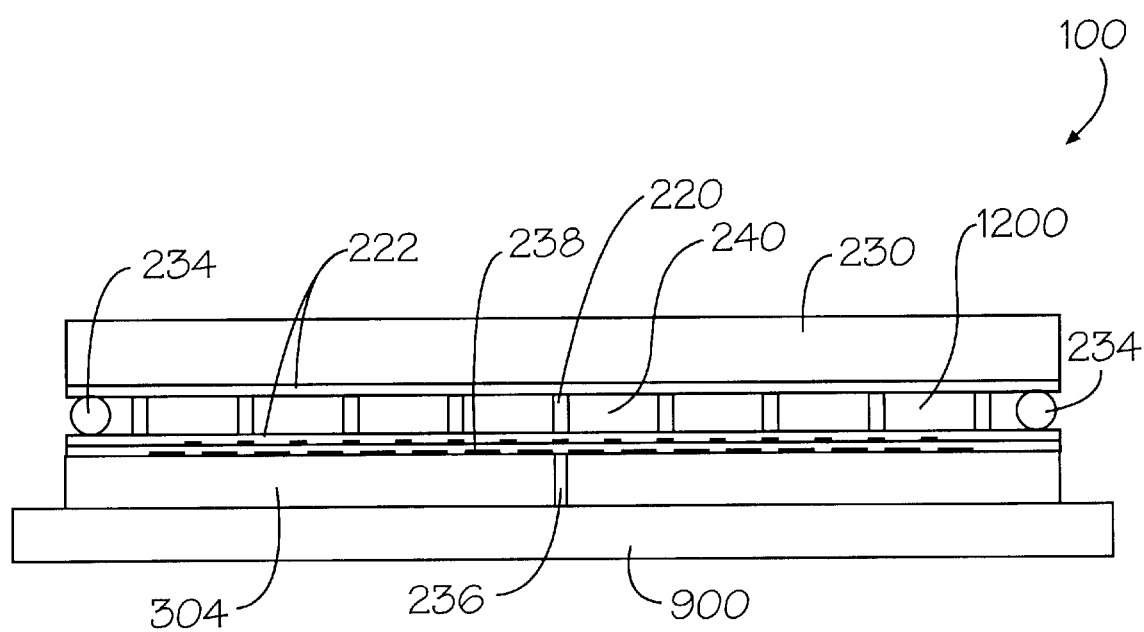
FIG. 12 is a cross-sectional view of a completed tiled microdisplay assembly with a seal on the tile.

Final assembly steps are shown in FIG. 12. Although many of the final assembly steps for a tiled $\mu$D 100 are the same as those for a monolithic $\mu$D, there are important differences, that will be described in the following. These differences arise from the filling and sealing of the liquid crystal 240 cavity, the optional alignment of any cover plate 230 patterns to the mirror array 238, and the implementation of one or more electrical contacts 228 from the cover plate 230 to the silicon tiles 304 and/or common substrate 900.

After assembly and processing of the tile array, it is appropriate to make the electrical connections to the edges of the tiles on their outer perimeters. This may be by conventional Tape Automated Bonding (TAB) or wire bonding. Consequently, the outer perimeter of the tiles are much higher than the surface mirrors. Thus, the cover plate is made to fit within this inner perimeter of the bonds. The active area of mirrors and pixels is further within this perimeter by the space needed for adhesive bonding and sealing the cover plate to the tiles. The seal 234 can be made using microfabrication, dispensing, and screen printing techniques listed according to decreasing precision. The same materials used in monolithic $\mu$D's can be employed. These include epoxy based adhesive materials that can provide a strong bond to the thin film layers on the silicon back plane 900 and the common cover plate 230. The final cured height of the seal 234 is determined by the spacers 220, typically about 2–3 $\mu$m in reflective LCD's.

The seal is made as a double moat for a termination with an opening for entry of the LC liquid and for a final seal with an epoxy plug after the LC filling process. The seal height is determined after pressing the cover plate in place with spacers contained in the seal material, or spacers microfabricated as previously described. These spacers may be slightly different in height compared to those on the surface of the active areas of the tiles for adjustment of cell gap near the perimeter of the active area to match the internal cell gap.

The spacing in the double moat area during dispensing and the distance of the seal to the pixels is determined so that on compression of the cover plate to the tiles, the opening for filling is maintained and there is no encroachment of seal material onto the pixels for a given volume of seal material.

If required, alignment of the cover plate 230 to the mirror array 238 can be done optically using techniques similar to those employed in optical contact lithography. Alignment marks, typically 3 or 4 not co-linear, on the cover plate 230 and the tile array 802 are matched under a microscope with a focal depth greater than the thickness of the LC fill 240, 2–3 µm typically. The cover plate 230 and the tile array 802 can be held in close proximity and their relative location (translation and rotation) changed until the marks match. The alignment will be made in two steps: first, approximate alignment, prior to pressing the cover plate into place; and second, within a fraction of a micrometer, (µm), after pressing and prior to curing the seal material. When the alignment is complete the cover and the tile array 802 can be pressed together. Alternatively, if the seal 234 is not yet cured, the cover 230 can be placed on the seal 234, and moved into alignment by observing the marks. When alignment is complete, the seal 234 can be spot cured, or uniformly cured, to lock the two pieces together.

After curing the seal material with conventional industry practice, the display is ready for LC filling. This is also accomplished using conventional industry practice. The display is exposed to vacuum and then immersed in LC as the pressure is increased toward atmospheric pressure. The exposed entrance is then sealed with epoxy while still retaining a small increment of vacuum.

The electrical connections 228 from the cover plate 230 to the tile array 802 can be made using technique similar to those in other LCDs by employing conductive adhesive. Mating conductive pads (not shown) are fabricated on the tile array 802 and the cover plate 230, typically outside the pixel array, and conductive adhesive is then used to make the connection. The height of the conductive adhesive will be similar to the height of the seal 234. This technique will work well as long as connections are large. That is, they have to be made only to groups of pixels or common electrodes, rather than individual pixels.

The common substrate 900, as noted earlier, is preferably a silicon plane, TCE matched to the tiles 304. It must be thick enough to spread heat from the tiles 304 into an assembled heat sinking structure, not shown. Several heat sink structure options are available depending on the power absorption level of the tiled assembly. Power absorption may be as low as 5 to 10 watts or as high as 50 watts per tile, depending on the size of the desired array, the light intensity desired at the screen and the magnification factor from the array to the screen. The losses of light after reflection from the array mirrors 238 may be very large, roughly 50% from the polarizer, not shown, and 25% from the screen, not shown. Some additional light is lost in the optics and interfaces due to mismatching of refractive indexes.

In the case where a color filter is used in place of the light emitting diodes, even more light may be lost. Because of these loses, a very high intensity light beam must be reflected from the mirrors. Some of the high-intensity, incident light is absorbed in the mirrors as well as in the dark spaces on the tiles.

The surface of the silicon tiles can be polished flat, as described earlier. A high degree of flatness is an important attribute which allows the tiles to be assembled to the silicon thermal spreader with a minimum thickness of adhesive. The adhesive may be filled with particles of high thermal conductivity material with particle sizes selected to bridge the gap from the tiles to the common substrate. These particles are preferably diamond because of its superior thermal conductivity. Other good conductors such as boron nitride, silicon carbide, and a wide range of ceramic materials including aluminum nitride are well known to those skilled in the art. These materials may be substituted for diamond when operating circumstances require a different choice of material. Metals having excellent thermal conductivity are also readily available in small particle sizes. Some examples are silver, copper, gold, tin and solder of various formulations. Silver is well known in the art for use as a thermally conducting filler for adhesives. For maximum thermal conductivity, the area of intimate contact between common substrate and tiles for each particle must be maximized.

To achieve optimal, uniform thermal conduction across the tile-to-back-plate interface, several of the following parameters, in addition to thermal conductivity, must be considered. These include: surface flatness of both the tile and the common substrate; particle size uniformity; surface area of contact between the particles and the surfaces; particle volume fraction in the adhesive; and retaining means.

Surface flatness has been discussed in detail hereinabove. Uniformly sized particles are available for various suitable materials, including metals. Efficient surface area of contact between the particles and the two surfaces may be achieved in various ways. One of the most efficient methods is to cover the two surfaces with a soft conducting metal, for example silver, copper, indium, tin, or solder. These metals may be sputtered, evaporated, or in some cases plated onto one or both surfaces. When the two surfaces are pressed together, sandwiching the adhesive and filler particles with sufficient pressure, the particles can penetrate these metal films and concurrently be deformed to increase their contact area. A retaining means may be required to keep the sandwich of surfaces and filled adhesive compressed. This retention can be supplied either externally by a mechanical clamping arrangement or by selecting an adhesive with curing and shrinkage properties such that adequate pressure on the filler particles is maintained after curing.

The common substrate is preferably either equal in size or larger than the tiled array so that the heat sinking area is maximized. Larger common substrates provide sufficient areas for fins or other similar structures to allow efficient forced air cooling. Alternatively, for more efficient heat sinking, the common substrate may be provided with channels and convection cooled with fluid circulation through the channels.

Finally, for the most efficient cooling necessary for the largest displays with highest intensity lighting, heat pipe structure may be utilized to conduct heat away from the tiles to a place where it may be adequately dissipated.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method for assembling a plurality of microdisplay tiles into a tiled, microdisplay, the projected image of said microdisplay having visually imperceptible seams in reflection, the steps comprising:

a) providing a plurality of monolithic, reflective microdisplay tiles, each microdisplay having a front, active face and a rear, mounting face, at least one inner, precision finished edge, each of said microdisplay tiles comprising an array of pixels having a predetermined pixel pitch and each tile having an integrated circuit silicon backplane embedded therein and a predetermined thermal coefficient of expansion (TCE);

b) three-dimensionally arranging said plurality of microdisplay tiles with respect to one another with said at least one inner, precision finished edge of a first one, of said plurality of microdisplay tiles adjacent to said at least one precision finished edge of a second one of said plurality of microdisplay tiles;

c) releasably attaching said plurality of microdisplay tiles to an optically flat carrier;

d) after said arranging step (b) and said attaching step (c), applying a filling material to said rear faces of said plurality of microdisplay tiles, if required, to fill any gaps between said inner, precision finished edges of said microdisplay tiles;

e) after completing said arranging step (d), attaching a thermally-conductive, common silicon substrate having a TCE substantially equal to said predetermined TCE of said microdisplay tiles to said rear faces of said plurality of microdisplay tiles;

f) after said attaching step (e), removing said plurality of microdisplay tiles from said optically flat carrier and polishing said front active faces of each of said plurality of microdisplay tiles to an optical local flatness of less than approximately 100 nm;

g) attaching a common transparent cover plate proximate said front faces of said plurality of microdisplay tiles; and h) placing liquid crystal material between said front faces of said plurality of microdisplay tiles and said common cover plate to complete a liquid crystal cell.

2. The method for assembling a plurality of microdisplay tiles into a tiled, microdisplay as recited in claim 1, wherein said attaching step (e) comprises the sub-step:

i) applying a thermally-conductive adhesive to at least one of said rear faces of said plurality of tiles and said substrate.

3. The method for assembling a plurality of microdisplay tiles into a tiled, microdisplay as recited in claim 2, wherein said thermally-conductive adhesive comprises an adhesive material having thermally-conductive particles dispersed therein.

4. The method for assembling a plurality of microdisplay tiles into a tiled, microdisplay as recited in claim 3, wherein said thermally-conductive particles comprise particles of at least one from the group of diamond, boron nitride, silicon carbide, aluminum nitride, other thermally-conductive ceramics, silver, copper, gold, tin, and solder.

5. The method for assembling a plurality of microdisplay tiles into a tiled, microdisplay as recited in claim 4, wherein said thermally-conductive particles are spherically shaped.

6. The method for assembling a plurality of microdisplay tiles into a tiled, microdisplay as recited in claim 2, wherein said thermally-conductive, common substrate comprises a cooling structure.

7. The method for assembling a plurality of microdisplay tiles into a tiled, microdisplay as recited in claim 6, wherein said cooling structure comprises a heat sink.

8. The method for assembling a plurality of microdisplay tiles into a tiled, microdisplay as recited in claim 7, wherein said heat sink comprises fins.

9. The method for assembling a plurality of microdisplay tiles into a tiled, microdisplay as recited in claim 6, wherein said cooling structure comprises channels for circulating a cooling fluid within said substrate.

10. The method for assembling a plurality of microdisplay tiles into a tiled, microdisplay as recited in claim 6, wherein said cooling structure comprises thermoelectric cooling means.

11. The method for assembling a plurality of microdisplay tiles into a tiled, microdisplay as recited in claim 6, wherein said cooling structure comprises a heat pipe.

12. The method for assembling a plurality of microdisplay tiles into a tiled, microdisplay as recited in claim 1, wherein said attaching step (e) further comprises the sub-step:

i) applying a thermally conductive, metallic coating to substantially the entire area of at least one of said rear faces of said plurality of tiles and said substrate to enhance thermal conductivity therebetween.

13. The method for assembling a plurality of microdisplay tiles into a tiled, microdisplay as recited in claim 12, wherein said conductive, metallic coating comprises a thin coating of a least one metal from the group of silver, copper, indium, tin and solder.

14. The method for assembling a plurality of microdisplay tiles into a tiled, microdisplay as recited in claim 13, wherein said applying sub-step (ii) comprises plating.

15. The method for assembling a plurality of microdisplay tiles into a tiled, microdisplay as recited in claim 13, wherein said applying sub-step (ii) comprises sputtering.

16. The method for assembling a plurality of microdisplay tiles into a tiled, microdisplay as recited in claim 13, wherein said applying sub-step (ii) comprises evaporation.

17. The method for assembling a plurality of reflective microdisplay tiles as recited in claim 1, wherein said attaching step (d) comprises arranging said plurality of microdisplay tiles with respect to a direction substantially perpendicular to the plane of said front faces of said microdisplay tiles.

18. The method for assembling a plurality of reflective microdisplay tiles as recited in claim 17, wherein arranging said plurality of microdisplay tiles with respect to a direction perpendicular to said faces results in tile-to-tile differences less than approximately 100 nm.

19. The method for assembling a plurality of reflective microdisplay tiles as recited in claim 18, wherein tile-to-tile differences in said perpendicular direction of said tiles in said arrangement is less than one half the distance between said faces thereof.

20. The method for assembling a plurality of reflective microdisplay tiles as recited in claim 18, wherein tile-to-tile differences in said perpendicular direction of said tiles in said arrangement is less than one quarter the distance between said faces thereof.

21. The method for assembling a plurality of reflective microdisplay tiles as recited in claim 18, wherein tile-to-tile differences in said perpendicular direction of said tiles in said arrangement is less than one tenth the distance between said faces thereof.

22. The method for assembling a plurality of reflective microdisplay tiles as recited in claim 17, wherein said optically flat carrier is removable.

23. The method for assembling a plurality of reflective microdisplay tiles as recited in claim 1, wherein said laterally arranging step (b) comprises arranging said plurality of microdisplay tiles with respect to at least one of two orthogonal, lateral directions parallel to said faces of said microdisplay tiles.

24. The method for assembling a plurality of microdisplay tiles into a tiled, microdisplay as recited in claim 1, the steps further comprising:

j) after completing said releasably attaching step (c), polishing said rear, mounting face of each of said plurality of microdisplay, if required.

* * * * *